United States Patent Office 3,451,202
Patented June 24, 1969

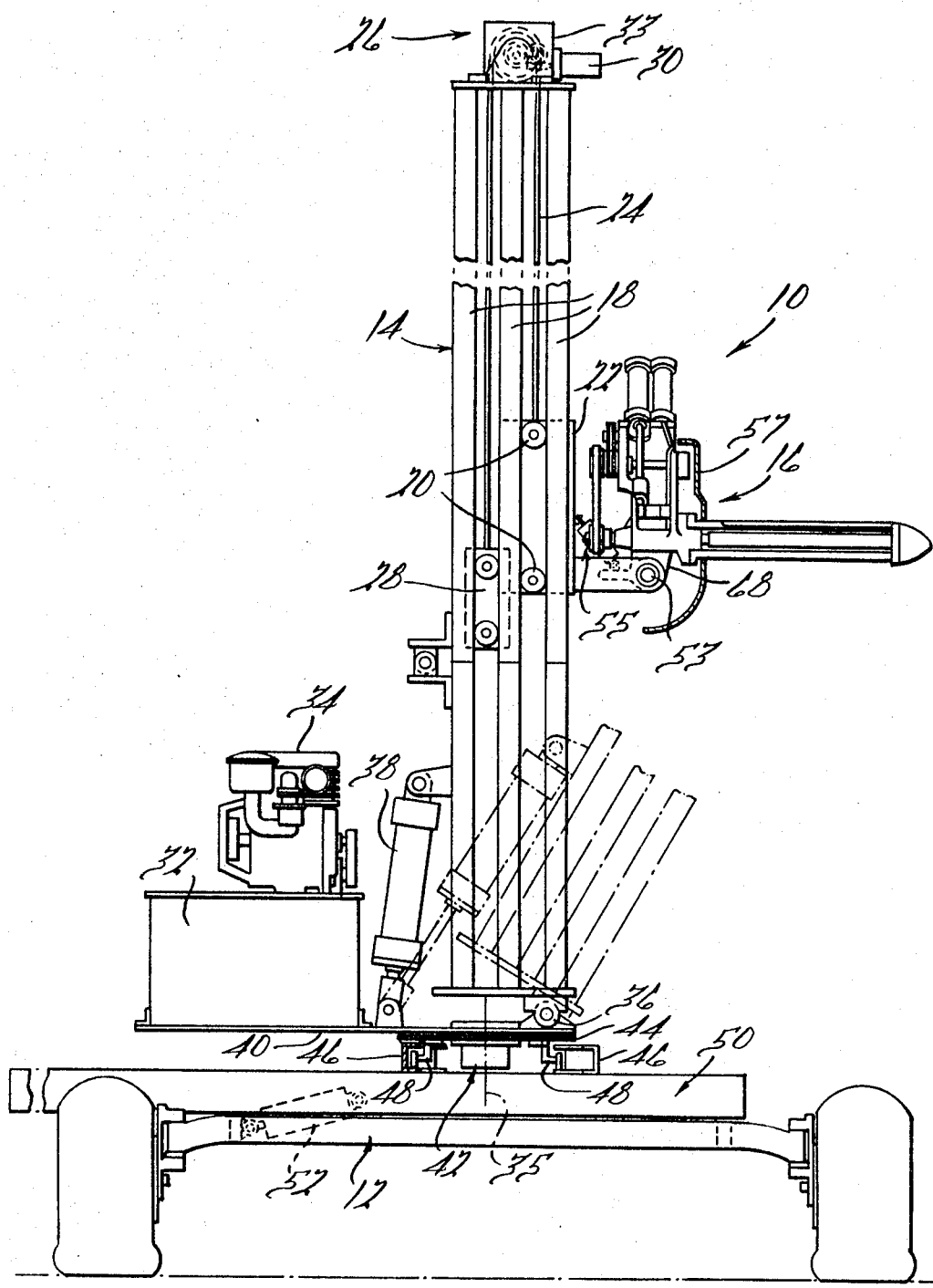

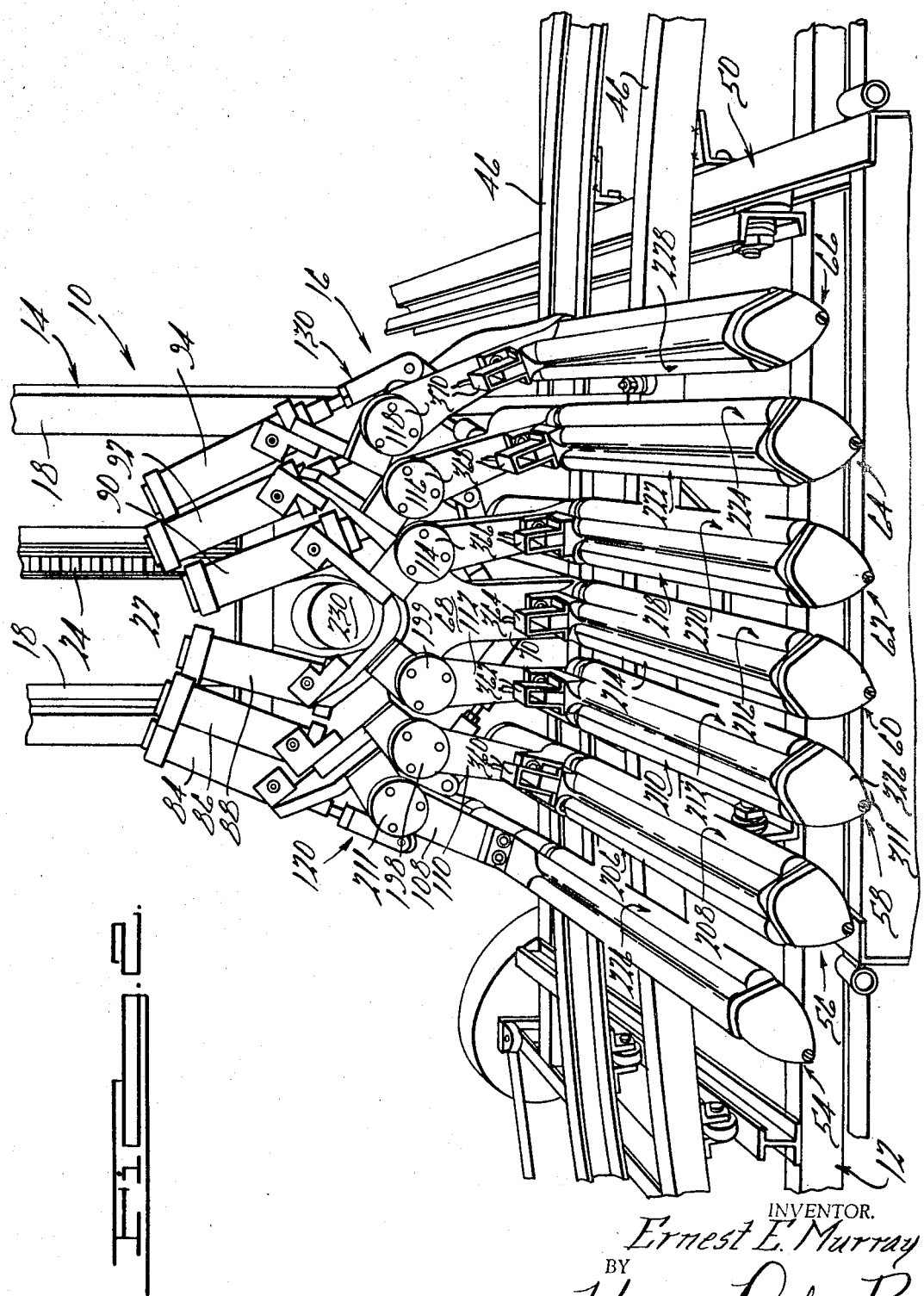

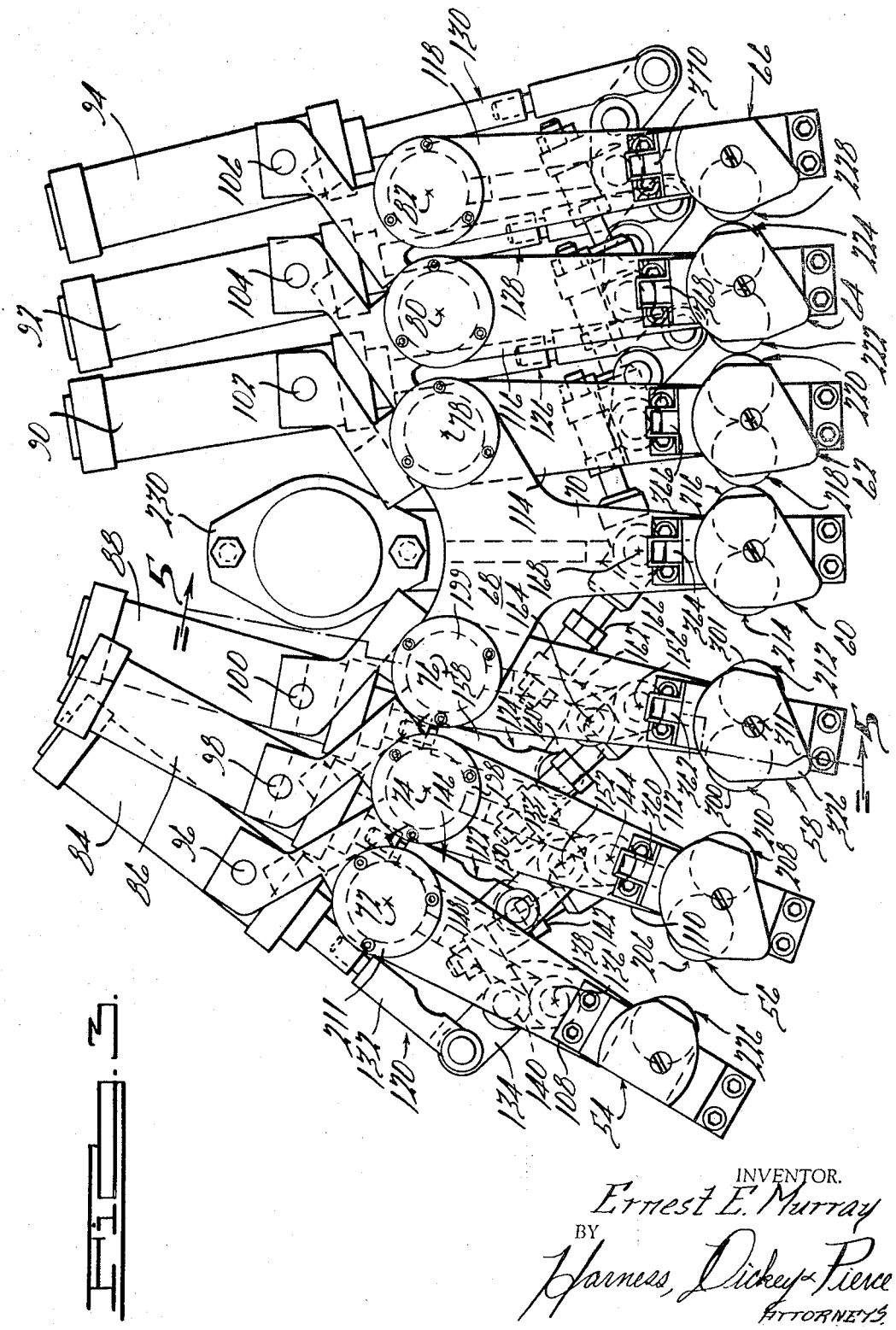

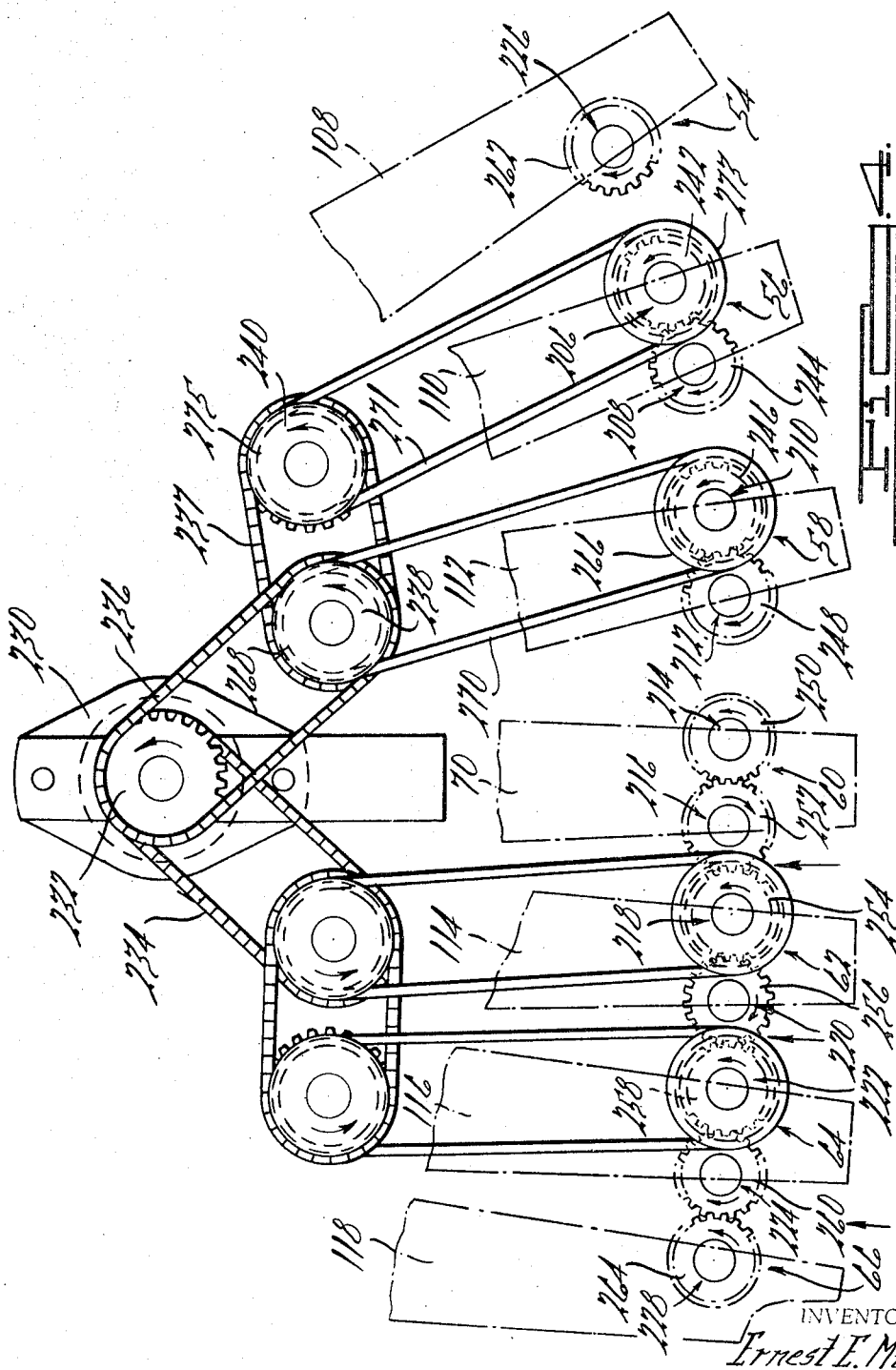

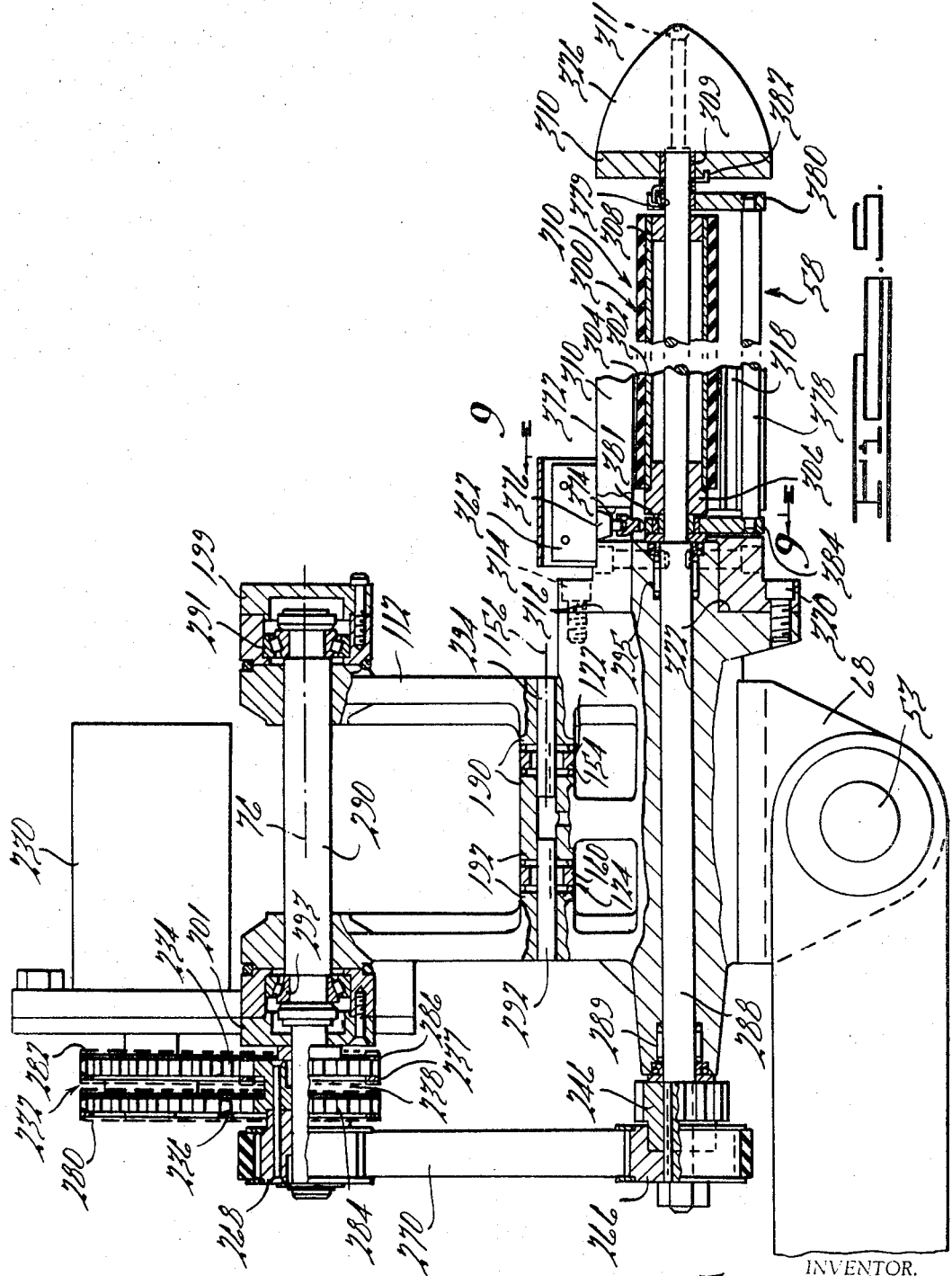

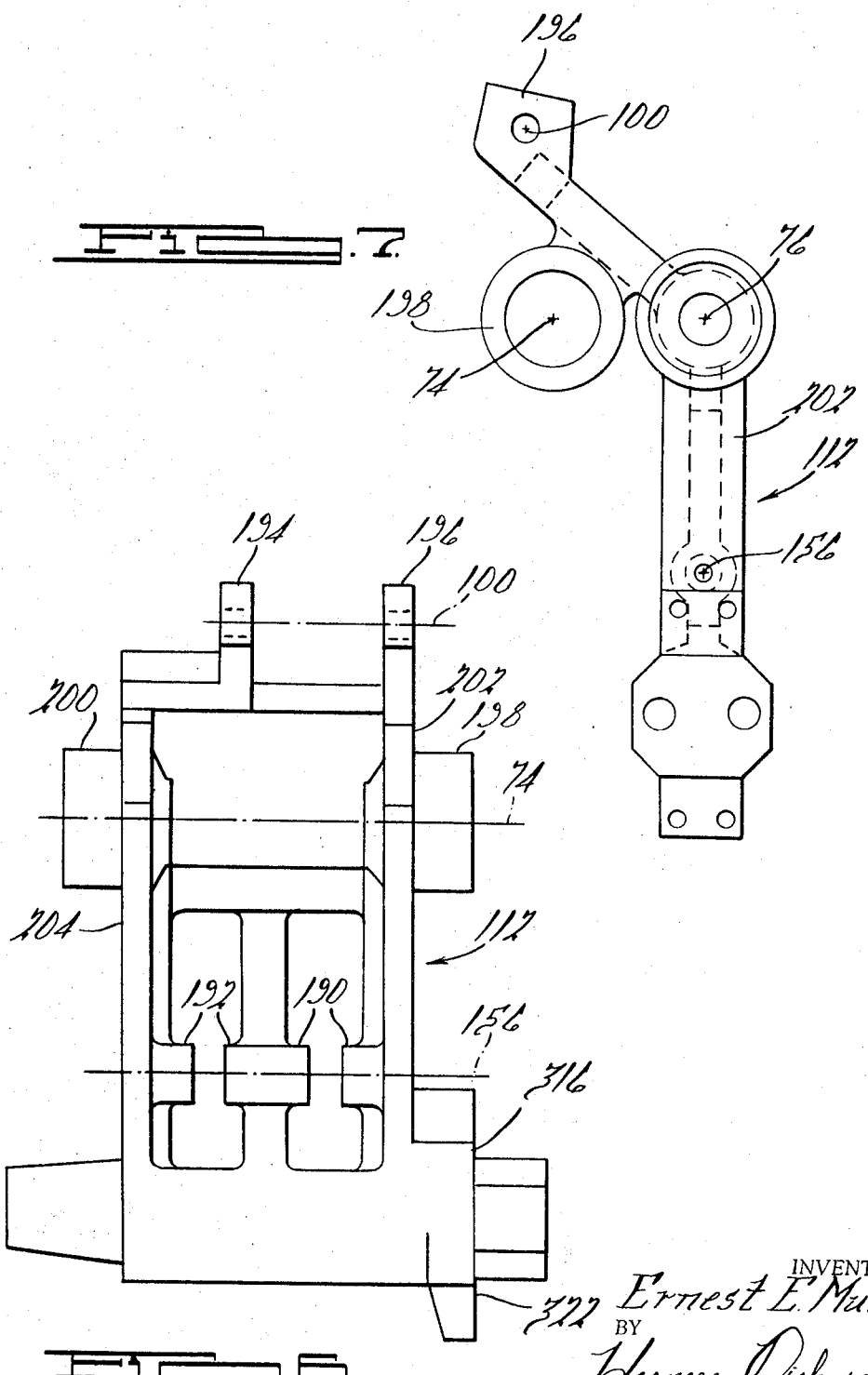

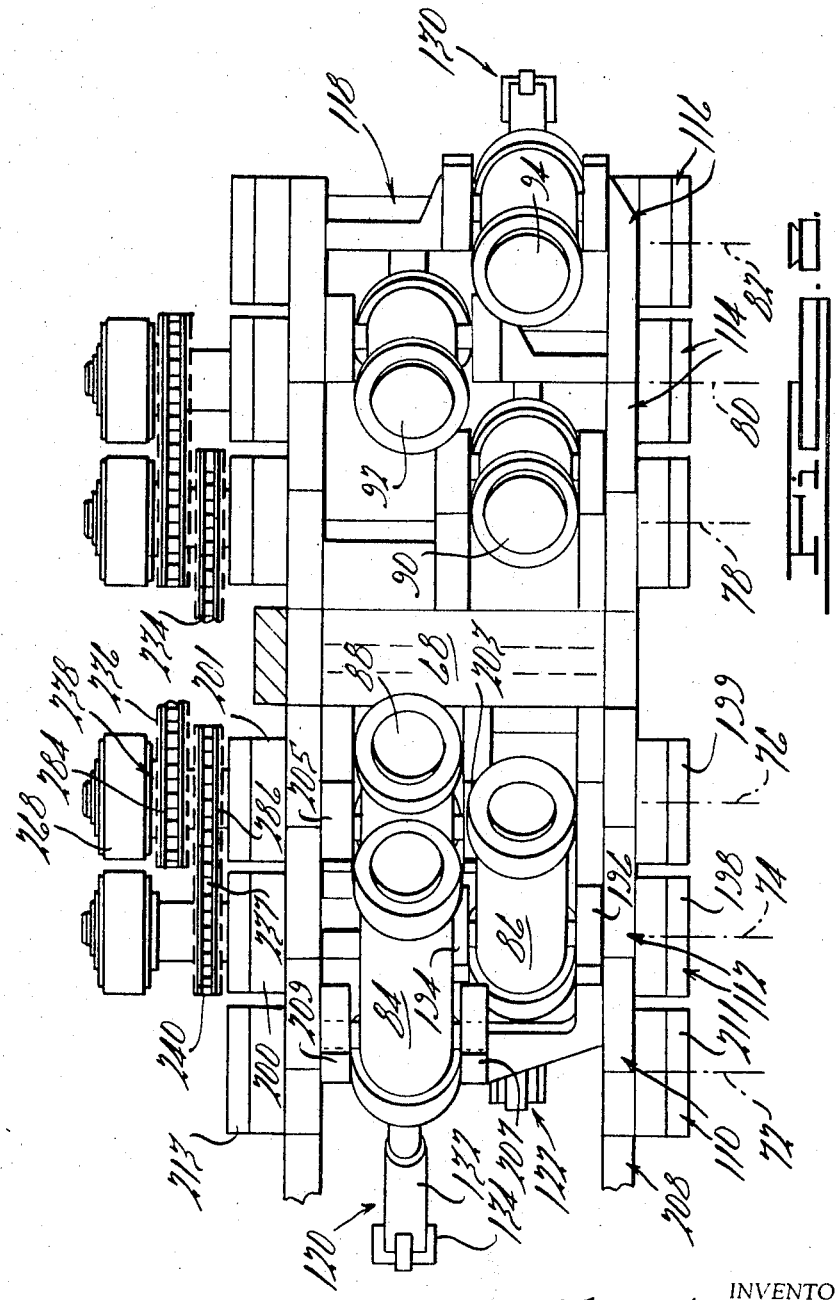

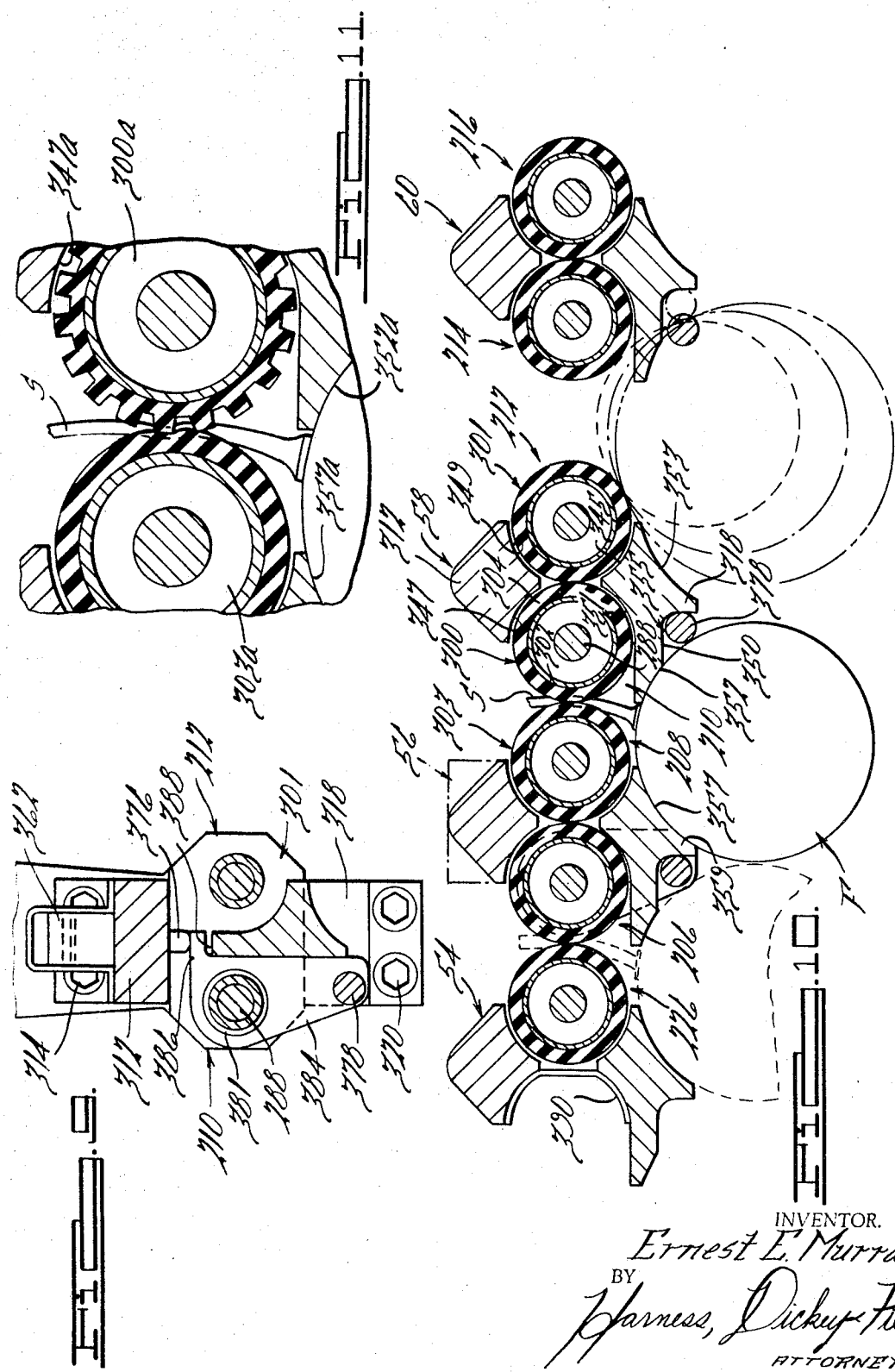

3,451,202
FRUIT PICKING APPARATUS
Ernest E. Murray, 6765 Meadow Lake,
Birmingham, Mich. 48010
Filed Dec. 6, 1966, Ser. No. 599,437
Int. Cl. A01g 19/00
U.S. Cl. 56—328                    30 Claims The present invention relates to fruit picking apparatus, and more particularly to a fruit picker construction for removing fruit such as oranges and the like from a tree.

The present invention is a modified form of the apparatus as shown in the copending patent application entitled, "Fruit Picking Apparatus," Ser. No. 536,901, now Patent 3,407,580, filed Mar. 23, 1966, the objects and specification of which are incorporated herein by reference.

The modified construction of the present invention has a plurality of spaced fingers with roller members, which fingers are movable relative to each other such that associated pairs of the roller members can either be proximate each other in gripping engagement or spaced apart from each other. In picking fruit from trees, in order to minimize damage to the tree, i.e. to the young buds, branches, etc., and also in order to facilitate combing of the fingers through the branches of the tree, it is desirable that the fingers normally be opened or apart and are closed only when the fruit to be picked is near the roller members on the fingers. In the present invention the fingers are normally apart and automatically close upon sensing the presence of the fruit to be picked and will automatically open again when the fruit has been removed. Therefore, it is an object of the present invention to provide a fruit picker of the above described type in which the fingers are movable towards and away from each other and will be selectively, automatically closed upon the sensing of fruit to be picked. As with the copending application, the fruit is removed by a relative force between the stem, which is gripped by the roller members, and the fruit which engages the fingers.

As noted in the copending application, it is desirable that in picking oranges a cocking action be utilized between the stem and the orange. In the present invention modified means are shown for providing this cocking action. It is another object of the present invention to provide novel means for removing the fruit such as an orange from the branch or stem by a cocking action.

In the present invention the fingers are a part of a finger assembly which is mounted on a support for movement generally vertically upwardly and downwardly whereby the tree to be picked can be combed by the fingers as the fingers assembly is moved along the support. In order to minimize snagging and possible damage to the limbs of the tree, the rotational speed of the individual roller members is selected to provide the same surface feet per minute rate of travel as the finger assembly has in moving downwardly along the support. Thus, as a branch is gripped and is fed through the roller members in the process of removing the fruit therefrom, both the downward movement of the finger assembly along the support and the feed of the branch through the roller members on the fingers will be approximately at the same speed thereby minimizing the possibility of damage to the tree structure.

Therefore, it is another object of the present invention to provide a fruit picker generally of the above described type in which the feed rate of the rollers is approximately the same as the combing speed of the finger assembly.

Other objects, features, and advantages of the present invention will become apparent from the subsequent description and the appended claims, taken in conjunction with the accompanying drawings, in which:

FIGURE 1 is an assembly drawing depicting a fruit picker embodying features of the present invention;

FIGURE 2 is a front pictorial view of a portion of the assembly of FIGURE 1 including the finger assembly;

FIGURE 3 is a front elevational view of the finger assembly of FIGURE 2;

FIGURE 4 is a partially diagrammatic, partially rear view of the finger assembly including the rotational drive mechanism;

FIGURE 5 is a sectional view of the finger assembly of FIGURE 3 taken generally along the line 5—5;

FIGURE 6 is a side elevational view of one of the support brackets of the finger assembly;

FIGURE 7 is a front elevational view of the support bracket of FIGURE 6;

FIGURE 8 is a top elevational, fragmentary, view with some parts broken away and others drawn in section of the finger assembly;

FIGURE 9 is a sectional view taken generally along the line 9—9 in FIGURE 5;

FIGURE 10 is a sectional view of the finger assembly generally taken along the line 10—10 in FIGURE 2 with some of the finger subassemblies shown in their closed positions; and FIGURE 11 depicts a modified roller assembly construction.

Looking now to FIGURE 1 of the drawings, a fruit picker assembly for picking oranges is shown and is generally indicate by the numeral 10 and comprises a wheeled platform assembly 12 and an upwardly extending scaffold assembly 14 on which is guidably mounted the finger assembly 16. The finger assembly 16 is guided between a plurality of rails such as rails 18 for vertically upward and downward movement utilizing rollers such as rollers 20 secured to a support and guide plate 22. The support and guide plate 22 has one end secured to a chain 24 which extends over a sprocket assembly 26 and has its opposite end connected to a counterweight 28 which is also guided by rails 18. The sprocket assembly 26 is driven by a fluid motor 30 through a gear reducer assembly 33 (only generally shown). The fluid motor 30 receives its fluid supply from a hydraulic pump assembly generally indicated by the numeral 32, which is adapted to be driven by an internal combustion engine 34. The scaffold assembly 14 is pivotably mounted to a support plate 40 by the pivot structure 36 at its forward lower end and can be selectively pivoted thereabout by means of a piston assembly 38. At the same time the scaffold assembly 14 and support plate 40 are mounted for rotation about an axis 35 by a swivel construction 42 which is connected to a secondary support member 44. The secondary member 44 is movably supported upon a pair of curved guide rails 46 (see FIGURE 2), the movement along the guide rails 46 being aided by roller assemblies 48 which are secured to the secondary support plate 44. In addition, the guide rails 46 are supported upon a platform 50 which can be moved relative to the wheeled platform assembly 12 by means of a piston 52. Thus, in the apparatus shown, the scaffold assembly 14 can be tilted about pivot structure 36 (shown in dash-dot line), can be rotated about axis 35, can be moved transversely by piston 52 and can be positioned an arcuate path or rails 46. All of these various motions aid in maneuvering the finger assembly 16 into desired positions relative to the tree to better facilitate the removal of the fruit. In addition, the finger assembly 16 can be pivoted independently about pivot 53 by means of piston 55. A shield 57 is provided to protect the apparatus from branches, etc.; this shield has been omitted from the other views for simplicity.

The various hydraulic motors and pistons are all powered from pump assembly 32; the various hose connections have been omitted for purposes of simplicity.

A pictorial view of the finger assembly 16 is shown in FIGURE 2 and comprises a plurality of finger subassemblies 54 through 66. The finger subassemblies are interconnected and are in general supported by a support housing 68 (see FIGURES 2 and 3) which is generally Y-shaped and which is pivotally secured to the guide plate 22 at pivot 53. The finger subassembly 60 is fixedly mounted to the downwardly extending leg portion 70 of the support housing 68 while the two immediately adjacent finger subassemblies 58 and 62 are secured to the upper arms of the Y for pivotal movement about the pivot axes 76 and 78, respectively. The finger subassemblies 56 and 64 are pivotally secured to subassemblies 58 and 62, respectively, for pivotal movement about pivot axes 74 and 80, respectively, while subassemblies 54 and 66 are pivotally secured to 56 and 64, respectively, for pivotal movement about pivot axes 72 and 82, respectively. Since the right and left hand sets of finger subassemblies relative to the fixed finger subassembly 60 function in a similar manner, only the details of the pivot structure for subassemblies 54, 56 and 58 will be discussed in detail.

The finger subassemblies 54, 56 and 58 are shown in their separated position in FIGURE 3 while the finger subassemblies 62, 64 and 66 are shown in their closed positions. A plurality of solenoid actuated hydraulic pistons 84, 86, 88, 90, 92 and 94 are connected to pump assembly 32 (fluid lines omitted for simplicity) and are pivotally supported at axes 96, 98, 100, 102, 104 and 106, respectively, and are associated and connected in a manner to be described, to pivot the finger subassemblies 54, 56, 58, 62, 64 and 66, respectively. The finger subassemblies 54, 56, 58, 62, 64 and 66 are pivotally supported about the pivot axes 72, 74, 76, 78, 80 and 82, respectively, by means of downwardly extending support brackets 108, 110, 112, 114, 116 and 118, respectively. Actuation of the hydraulic piston 84, through energization of its solenoid (not specifically shown) will pivot finger subassembly 54 into engagement with the finger subassembly 56.

Actuation of the piston 86 will pivot the finger subassembly 56 into engagement with the finger subassembly 58; as this occurs, the finger subassembly 54 will be moved along with the finger subassembly 56 without affecting the spacing there-between. Upon actuation of the piston 88, the finger subassembly 58 will pivot into engagement with the finger subassembly 60; as this occurs, the finger subassemblies 54 and 56 will be moved along with the finger subassembly 58 without affecting the spacing of subassemblies 54 and 56. Actuation of the pistons 90 through 94 on the right hand side affect the associated apparatus in a similar manner.

Each of the pistons 84, 86, 88, 90, 92 and 94 is connected to its associated finger subassemblies by linkage assemblies 120, 122, 124, 126, 128 and 130, respectively. Each of these linkage assemblies is of a toggle type construction. Linkage assembly 120 includes an extension subassembly 132 which is connected to the piston rod of the piston 84 for reciprocation therewith. The free end of the extension subassembly 132 is pivotally connected to one arm of a bell crank 134 which has its opposite end pivotally connected to the bracket 108 at axis 136. A link member 138 is pivotally connected at pivot 140 which is intemediate the two legs of the bell crank 134. The outer end of the connecting link 138 is fixed to one end of a link member 142 which has its opposite end pivotally connected to the support bracket 110 at axis 144. In operation, actuation of the piston 84 causes the extension subassembly 132 to be moved downwardly resulting in pivotal movement of the bell crank 134 about the axis 136 pivoting the bracket 108 about axis 72, moving the finger subassembly 54 into engagement with the finger subassembly 56. During this action the support bracket 110 is held from movement by the interconnecting link to be described. The linkage assembly 120, as noted, is of a toggle construction and the forces initially applied on the support bracket 108 are light; however, in the closed position the over center toggle action will lock the two finger subassemblies 54 and 56 together (see for example the linkage assembly 126 which is shown closed). The linkage assembly 122 associated with the piston 86 and interconnecting the brackets 110, 112 is similar to link assembly 120 and includes an extension subassembly 146, which is connected at one end to a bell crank 148 which is connected to the extension support at the pivot axis 144. A connecting link 150 is pivotally connected to an intermediate pivot axis 152 on the bell crank 148 and is connected to link member 153 which is pivotally connected to the support bracket 112 at the pivot axis 156. Actuation of the piston 86 causes actuation of the linkage assembly 122 in a manner similar to that to which the piston 84 causes action of the linkage assembly 120 thereby causing movement of the support bracket 110 toward the support bracket 112 bringing the finger subassemblies 56 and 58 into engagement with each other. At the same time by virtue of the interconnection of the linkage assembly 120, the support bracket 110 will move with the support bracket 108 while maintaining its original relationship therewith, with the piston 84 being pivoted about the pivot axis 96 and the support bracket 108 being pivoted about the axis 72. The same toggle action as previously mentioned in conjunction with the discussion of linkage assembly 120 takes place with respect to the linkage assembly 122.

The linkage assembly 124 functions in a manner similar to linkage assemblies 120, 122 and has its extension subassembly 158 pivotally connected to one end of bell crank 160 which has its opposite end pivotally connected to the support bracket 112 at the axis 156. A connecting link 162 is pivotally connected at intermediate axis 164 of the bell crank 160 and has a link member 166 fixedly connected at one end thereto with its opposite end pivotally connected to the fixed leg portion 70 for pivoting about the axis 168. Upon actuation of the piston 88, by virtue of the linkage assembly 124, the support bracket 112 will be moved toward the fixed leg portion 70 bringing the finger subassembly 58 into engagement with the finger subassembly 60. As this occurs, the support brackets 110 and 108 will be moved along with the support bracket 112 by virtue of the linkage assemblies 122 and 120; however, the physical relationship between the finger subassemblies 54 and 56 and 56 and 58 will not be affected. The over center, toggle action will occur for each of the linkage assemblies 120, 122 or 124 which is actuated.

The support brackets 108 through 118 are generally of similar constructions and hence only the details of support bracket 112 will be described. Side and front views of the support bracket 112 are shown in FIGURES 6 and 7. The axis 156 is defined by through bores extending through a forward pair of bosses 190 and a rear pair of bosses 192. A pair of upwardly extending, spaced ears 194 and 196 are provided with in line bores to define the pivot axis 100 for the piston 88. A pair of spaced bosses 198 and 200 located at the forward and rearward ends of the support bracket 112 are provided with in line bores which define the pivot axis 74; in addition, a bore at the upper end of the support bracket 112 defines the pivot axis 76. The bosses 198, 200 are offset from the inner and outer faces 202 and 204, of the main body of the support bracket 112 (see FIGURE 8). The support bracket 110 is constructed in a similar manner and hence its inner and outer faces (corresponding to faces 202 and 204) can be received between the bosses 198 and 200 and can be journaled along the axis 74 by a shaft. In a similar manner the support bracket 112 will be journaled along the axis 76 between a pair of bosses 199 and 201 at the left arm of the fixed Y-shaped support housing 68. The housing 68 has a pair of ears 203, 205 for supporting the piston 88. Likewise, the support bracket 110 has a pair of ears 207, 209 for supporting the piston 84.

The above ear structures are offset in order to provide for clearance of the pistons 84, 86, and 88. Thus, the ears 194, 196 are located at the forward end of the support bracket 112; ears 203, 205 of housing 68 and ears 207, 209 of bracket 110 are located at the rearward ends (see FIGURE 8). Note in FIGURE 8, like FIGURE 3, the right hand finger subassemblies 62, 64 and 66 are shown in their closed or actuated positions while the left hand finger subassemblies 54, 56, and 58 are shown in their open or deactuated positions. The support bracket 108 does not support a piston and hence does not have ears such as the ears 194 and 196, nor is it provided with bosses such as 198 and 200, since it is supported for rotation about the axis 72 between the bosses 211, 213 associated with the support bracket 110. The right hand terminating supporting bracket 118 is constructed similarly to the support bracket 108.

Each of the support brackets 108, 110, 114, 116 and 118 and the downward leg portion 70 of the housing 68 are constructed similarly to support bracket 112 in defining inner and outer bosses similar to the pairs of bosses 190 and 192. This structure permits the axial forward and rearward staggering of the linkages 120 through 130 in much the same manner as the pistons 84 through 94. Thus the linkage assembly 124 which is actuated by the piston 88 is journaled between the rearward bosses 192 of support 112 and is journaled between similarly constructed rearward bosses in the lower leg portion 70 of housing 68 to interconnect the support bracket 112 to the downward leg portion 70. The linkage assembly 112, however, which interconnects the support brackets 110 and 112 and is actuated by the forwardly located piston 86 is journaled at the forward bosses, such as bosses 190 in support bracket 112. In the construction to the right, the support brackets 114 and 110 are similarly constructed while support brackets 112 and 116 are similarly constructed. Thus, the piston 90 is forwardly located on the right arm of the Y-shaped housing 68 and hence the linkage assembly 126 will interconnect the support bracket 114 and lower leg portion 70 at forward pairs of bosses such bosses 190; the remaining pistons and linkage assemblies to the right are axially forwardly and rearwardly staggered in the manner similarly described for left hand structure.

The finger subassemblies 56 through 64 are all similarly constructed with each having pairs of roller assemblies 206 and 208, 210 and 212, 214 and 216, 218 and 220, and 222 and 224, respectively. The outside finger subassemblies 54 and 66 are each provided with single roller assemblies 226 and 228, respectively.

The roller assemblies all are rotated by a fluid motor 230 which is supported on the housing 68 at the upper center thereof. FIGURE 4 is a partially diagrammatic, partially rear view of the drive mechanism for driving the roller assemblies. The fluid motor 230 receives its fluid energy from the hydraulic pump assembly 32 and is provided at its rearward end with a sprocket assembly 232. This provides a chain drive to the right hand set of finger subassemblies (left as viewed in FIGURE 4) by means of chain 234 and provides a chain drive to the left hand set of finger subassemblies (right as shown in FIGURE 4) by means of chain 236. Since both the right and left hand drives are similar, only the left hand drive (right in FIGURE 4) will be described in detail. The chain 236 engages a double sprocket assembly 238 journaled on support bracket 112, which in turn drives a sprocket assembly 240 on the adjacent support bracket 110. Each of the roller assemblies 206 through 226 is provided at its rearward end with a gear drive member 242 through 262; the pairs of gears for the associated ones of the pairs of roller assemblies are constantly in mesh and hence rotation imparted to one of these gears will cause rotation of the other gear and hence of the two roller assemblies. A cog wheel 266 is secured for rotation with the gear 246 associated with the support bracket 112. A similar cog wheel 268 is secured for rotation with the sprocket assembly 238. A cog belt 270 interconnects the cog wheels 266 and 268 and hence as the sprocket assembly 238 is rotated by the chain 236 gears 246 and 248, and hence the roller assemblies 210 and 212, will be rotated. A chain 237 interconnects the sprocket assemblies 240 and 238 whereby assembly 240 is driven by assembly 238 as a result of which a cog belt 271 connected to cog wheels 273 and 275 will drive the roller asemblies 206 and 208. Note that neither the center roller assemblies 214 or 216 nor the end roller assemblies 226 or 228 are directly driven by the fluid motor 232, but as will be seen are driven by adjacent roller assemblies. Looking to the right (left, in FIGURE 4) hand side of the finger assembly 16, when the finger subassemblies are moved to their engaging positions, their associated gears will engage the adjacent, previously spaced gears. Thus as the support bracket 112 is moved to bring the roller assemblies 212 and 214 into engagement the gears 248 and 250 will engage, whereby gear 250 will be driven and hence roller assemblies 214 and 216 will be driven. In like manner, when the end support bracket 108 is pivoted to bring the roller assemblies 226 and 206 into engagement, the gears 242, and 262 will engage whereby the gear 262 and hence the roller assembly 226 will be rotated. The roller assemblies 206, 210, 214, 218, 222 and 228 will all be rotated clockwise while their cooperating roller assemblies 226, 208, 212, 216, 220 and 224 will all be rotated counterclockwise; thus when associated pairs of the finger subassemblies 54–66 are closed the associated ones of the roller assemblies 206–228 will be rotated in a direction to feed the limb or branch of the tree upwardly therethrough.

Looking now to Figure 5, some of the details of the drive previously described are further shown in conjunction with details of the finger subassembly 58, the support bracket 112 and the drive mechanism associated therewith; also the details of roller assembly 210 are more specifically shown.

Looking now to Figure 5, the sprocket assembly 232, connected to the fluid motor 230, has a pair of drive sprockets 280 and 282, with the sprocket 280 being connected to the driven sprocket 238 by the chain 236, while chain 234 is connected to sprocket 282. The drive sprocket 238 is also of a double sprocket construction having sprockets 284 and 286 with sprocket 284 being connected by the chain 236 and sprocket 286 being connected to the sprocket assembly 240 by chain 237. The cog wheel 268 is fixed for rotation with the sprocket assembly 238 and the cog belt 270 is connected directly to the lower cog wheel member 266; fixed to the cog wheel 266 is the gear member 246, both of which are fixed to the rearward end of a journaled shaft 288.

The upper cog wheel 268 and sprocket assembly 238 are journaled on a shaft 290 which defines the axis 76 about which the support bracket 112 pivots. The shaft 290 is fixed to the upper end of the support bracket 112 and is journaled in bearings 291, 293 at opposite ends located in the bosses in the left arm of the Y-shaped support housing 68 whereby support bracket 112 can pivot relative to the support housing member 68.

The forward bosses 190 and rearward bosses 192 define the pivot axis 156. The bell crank 160 of the linkage assembly 124 is shown journaled by a pin 292 between the bosses 192, while the connecting link 154 of the linkage assembly 122 is journaled between the bosses 190 by means of a pin 294.

Considering now the details of the finger sub-assembly 58, the shaft 288 is a part of the roller assembly 210 and is journaled at opposite extremities of the support bracket 112 via bearings 289, 295. The companion roller assembly 212 (not shown in FIGURE 5) is supported adjacent to the roller assembly 210 and at the other side of the lower end of the support bracket 112.

The shaft 288 has a roller member 300 secured to its forward extension. The roller member 300 is of a generally tubular shape and includes a tubular metallic core 302 and an outer shell 304 of generally elastic material. Plugs 306 and 308 enclose the inner and outer ends, respectively. The shaft 288 extends slightly beyond the extremity of the roller member 300 and terminates within and is journaled in a sleeve bearing 309 in support plate 310. Roller assemblies 206 through 228 are all generally similarly constructed.

An upper guide 312 is secured by bolts, such as bolt 314, to a forwardly located upper ledge 316 on the support bracket 112. A lower guide 318 is secured by bolts such as bolt 320 to a lower ledge 322 on the support bracket 112. Both the upper and lower guides 312 and 318 extend generally coextensively with the roller member 300 and with the companion roller member 301 associated with the roller assembly 212 and serve to keep material out from between the two roller members 300 and 301. Both the roller members 300 and 301 are supported at the forward end of the support plate 310. A cone shaped guide member 326 is secured to the outer end of the support plate 310 by a bolt 311 and facilitates guiding the finger subassembly 58 through the limbs of the tree to be acted upon.

Looking now to FIGURE 10, the upper guide 312 has generally a smoothly, symmetrically tapering upper surface to avoid snagging with the branches of the tree to be picked, while its inner surface is generally formed of two arcuate surfaces 347, 349 located proximate to the roller members 300 and 301. All of the upper guides are alike. The lower guide 318 has two arcuate inner surfaces 351, 345 located proximate to roller members 300 and 301. The lower or outer surface of the lower guide 318 also tapers generally smoothly but is not symmetrically constructed. The right hand extension 353 of the lower guide 318 extends generally in a smooth arc to a point in vertical alignment with the axis of the roller member 301 while the left hand extension 355 is provided with a longitudinally extending notched portion 350 which connects to a generally transversely extending arcuately shaped pressure portion 352. The pressure portion 352 extends generally to a point in vertical alignment with the radially outer extremity of the roller member 300. Since all of the lower guides are alike, the pressure portion 352 cooperates with a right hand surface support portion 357 of the lower guide 359 of the adjacent finger subassembly 56 to provide a cocking action to the fruit as it is acted upon. In FIGURE 10 the finger subassemblies 56 and 58 are shown actuated and a fruit F has been drawn by the cooperating roller members 300 (of subassembly 58) and 303 (of subassembly 56) into engagement with the surfaces 352 and 357. In this position the stem S in order to pass through the roller members 300, 303 will be cocked relative to the fruit F to facilitate removal of the fruit F from the stem S without tearing the skin of the fruit F. This cocking action simulates the action of removing oranges when they are hand picked. In addition, the surface of the pressure portion 352 is located to engage the fruit F near the stem S whereby pressure will be applied to the skin of the fruit F adjacent the stem to support the skin and prevent its tearing as he fruit is removed.

The finger subassemblies 54 through 66 are normally opened as shown in FIGURE 2 and will be individually closed upon actuation of the associated one of the pistons 84 through 94 which in turn are actuated by the micro-switches 360 through 370, respectively. Each of the finger subassemblies, except subassembly 54, has a micro-switch mounted thereon in the same manner as micro-switch 362 which is mounted upon a flat upper surface 372 on the upper guide 312 which has a slot 374 through which the actuating plunger 376 of the micro-switch 362 extends. Actuation of the micro-switches 360 through 370 is caused by bars such as sensing bar 378 associated with switch 362. Sensing bar 378 is located on the left hand side of the lower guide 318 and in the longitudinally extending notch 350 (see FIGURE 5). The sensing bar 378 is secured at its forward end to a pivot plate 380 which is journaled at its upper end to the outer end of the shaft 288 by a sleeve bearing 379. A spring member 382 is secured between the support plate 310 and pivot plate 380 and normally biases the pivot plate 380 and hence the sensing bar 378 to a position out from the notch 350. The opposite end of the sensing bar 378 is secured to an inner pivot plate 384 (see FIGURES 5 and 9) which is also journaled upon the shaft 288 by a sleeve bearing 381. The plate 384 has an upper finger portion 386 which is positioned to be engageable with the actuating button 376 for the micro-switch 362. The spring bias created by the spring 382 normally maintains the finger 386 out of actuating engagement with the button 376 and against a stop surface 388 which defines the outermost position of the sensing bar 378.

The roller assemblies 206, 214, 218, 222 and 228 are all similar in construction to roller assembly 210 as shown in FIGURE 5; the roller assemblies 208, 212, 216, 220, 224 and 226 are similar in construction to roller assembly 210 as shown in FIGURE 5 with the main difference being in the absence of the sensing bar 378 and its associated apparatus; the distinctions in the drive mechanism, between the various roller assemblies 206–228 have previously been described.

In operation, as the finger subassemblies 54 through 66 are combed through a tree to be picked, the finger subassemblies are in their opened positions, as shown in FIGURE 2. When a fruit, such as the fruit F, engages the sensing bar 378, moving it inwardly against the bias of the spring 382 it causes the button 376 of the switch 362 to be moved upwardly to actuate the switch 362 which actuates the solenoid of the piston 86, causing the support brackets 110 and 112 to be moved toward each other until the roller members 300 and 303 of the roller assemblies 208, 210, respectively are in engagement with each other. When this occurs, the stem S of the fruit F will be gripped and because of the rolling action of roller members 300, 303 the fruit F will be pulled upwardly until it engages the support and pressure surfaces of the associated lower guide bars. The relative force applied between the stem S and the fruit F will be sufficient to remove the fruit F from the stem S; as previously noted the action of the pressure surface 352 causing the stem S to be generally drawn off center with regard to the fruit F will provide a cocking action to facilitate removal of the fruit without injury to the skin. The finger subassemblies 56 through 64 are generally provided with a structure similarly as described in conjunction with the description of the finger subassembly 58 and cooperate with their associated subassemblies in the same manner as previously described for subassemblies 56 and 58. With regard to the finger subassembly 54, only a single roller assembly 226 is provided which is of a construction similar to the right hand roller assembly 212 of the finger subassembly 58. The finger subassembly 66 has only a single roller assembly 228 which is similar in construction to the left hand roller assembly 210. A cover plate, such as plate 390 on subassembly 54, is located between the upper and lower guides at the outer side of both of the finger subassemblies 54 and 66.

The speed of the fluid motor 230 and drive ratios to the various roller assemblies 206 through 228 are provided such that the surface feet per minute or linear feed rate of the roller assemblies 206 through 228 is proximate to the linear travel rate of the finger assembly 16 as caused by fluid motor 30. Thus as the finger subassemblies 54 through 66 are combed through the branches of a tree, the travel rate relative to a limb which is gripped and one which is not gripped is approximately the same, thereby avoiding damage to the limbs of the tree.

In a slightly modified form, alternate ones of the roller members are provided to be of different durometers with the one of a harder durometer having a plurality of longitudinal, axially extending grooves to facilitate gripping of the stem (see FIGURE 11). In FIGURE 11, components similar to like components in the previously described structure are given the same numerical designations with the addition of the letter postscript a. By providing the roller member 300a, with the longitudinal grooves and to be of a harder durometer than the other roller member 303a there will be a tendency for the teeth formed by the grooves to bite into the softer roller member 303a to aid in gripping the stem.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A fruit picker for picking fruit such as oranges or the like from a tree comprising: finger means defining a comb-like structure for combing through the branches of a tree and comprising at least one pair of finger subassemblies for removing the fruit from the tree and actuating means for supporting said finger subassemblies and selectively actuable for moving said finger subassemblies towards each other to a closed position and away from each other to an open position, removal means including roller means on said finger subassemblies for removing the fruit in said closed position and facilitating combing through the tree in said open position.

2. The apparatus of claim 1 with said actuating means comprising sensing means for sensing the presence of and for providing a signal when fruit is proximate to said finger subassemblies with said actuating means moving said finger subassemblies to said closed position in response to said signal.

3. The apparatus of claim 2 with said sensing means including a sensing bar supported for movement with said signal being provided when said sensing bar is moved by the fruit.

4. The apparatus of claim 3 with said sensing bar extending generally for the length of said finger subassemblies, means supporting said sensing bar on one of said finger subassemblies for pivotal movement towards and away from the other of said finger subassemblies.

5. The apparatus of claim 4 with said sensing means including a switch means having first and second conductive conditions and for providing said signal in said first conductive condition and being operatively connected with said sensing bar for being placed in said first conductive condition when said sensing bar is moved away from said other of said finger subassemblies.

6. The apparatus of claim 1 with said roller means including a pair of roller members, one on each of said finger subassemblies, for gripping the stem of the fruit with said finger subassemblies in said closed position, rotating means for rotating said roller members in a direction for feeding the stem through said finger subassemblies in said closed position, and guide means located proximate to each of said roller members for engaging the fruit whereby a relative force will be applied between the fruit and the stem for removal of the fruit, said guide means moving the fruit to a position offset from a point located directly in between said roller members whereby the fruit will be cocked relative to the stem.

7. The apparatus of claim 6 with said guide means comprising first and second longitudinally extending lower guides each located proximate to and at the bottom of one of said roller members, said first guide having a pressure portion extending to a position approximately in line with the radially outer surface of said one of said roller members with which it is associated.

8. The apparatus of claim 7 with said first pressure portion of said first guide being contoured to engage the fruit at a position near its stem and thereby applying pressure to the skin of the fruit at that position as the fruit is removed from the stem.

9. The apparatus of claim 8 with said second guide having a second support portion for engaging the fruit at a point further from the stem.

10. The apparatus of claim 9 with said actuating means comprising sensing means for sensing the presence of and for providing a signal when fruit is proximate to said finger subassemblies with said actuating means moving said finger subassemblies to said closed position in response to said signal.

11. The apparatus of claim 10 with said sensing means including a sensing bar extending generally for the length of one of said guides and located proximate to the support portion of said one of said guides, means for supporting said sensing bar on that one of said finger subassemblies associated with said one of said guides for pivotal movement towards and away from the other of said finger subassemblies.

12. The apparatus of claim 11 with said sensing means including a switch means having first and second conductive conditions and for providing said signal in said first conductive condition and being operatively connected with said sensing bar for being placed in said first conductive condition when said sensing bar is moved away from said other of said finger subassemblies.

13. The apparatus of claim 1 with said finger means comprising a plurality of finger subassemblies, at least some of said finger subassemblies having a pair of roller members with said removal means including confronting pairs of said roller members on adjacent ones of said finger subassemblies.

14. The apparatus of claim 13 with said actuating means including linkage means for connecting associated pairs of said finger subassemblies for separate movement without disturbing the relative positional relationship between the other associated pairs of said finger subassemblies.

15. The apparatus of claim 14 with said actuating means comprising sensing means for each associated pair of said finger subassemblies for sensing the presence of and for providing a signal when fruit is proximate to said associated pair of said subassemblies with said actuating means moving only that associated pair of said finger subassemblies providing said signal.

16. The apparatus of claim 15 with said finger means including at least three of said finger subassemblies and with the first and the second and the second and the third of said finger subassemblies being first and second associated pairs for removing fruit, said linkage means interconnecting said three of said finger subassemblies for movement to said closed and open positions of the said finger subassemblies of one of said associated pairs without altering the positional relationship between the said finger subassemblies of the other of said associated pairs.

17. The apparatus of claim 16 with said first finger subassembly of said first associated pair being fixed and with said linkage means moving said third finger subassembly with said second finger subassembly as said second finger subassembly is moved to said closed and open positions relative to said first finger subassembly.

18. The apparatus of claim 17 with said actuating means comprising a support bracket for each said finger subassemblies, a first, fixed said support bracket for said first finger subassembly, pivot means pivotally connecting a second said support bracket for said second finger subassembly to said first support bracket, said pivot means pivotally connecting a third said support bracket for said third finger subassembly to said second support bracket.

19. The apparatus of claim 18 with said linkage means comprising a first toggle linkage means connecting said first and second finger subassemblies and being in an over center condition for locking said first and second finger subassemblies when in said closed position.

20. The apparatus of claim 19 with said roller means including a pair of roller members, one on each of said finger subassemblies, for gripping the stem of the fruit with said finger subassemblies in said closed position, rotating means for rotating said roller members in a direction for feeding the stem through said finger subassemblies in said closed position, and guide means located proximate to each of said roller members for engaging the fruit whereby a relative force will be applied between the fruit and the stem for removal of the fruit, said guide means moving the fruit to a position offset from a point located directly in between said roller members whereby the fruit will be cocked relative to the stem.

21. The apparatus of claim 20 further comprising vertical support means for supporting said finger means for up and down vertical movement, said vertical support means including conveying means for moving said finger means at a rate of linear travel substantially the same as the linear feed rate of a stem through an associated pair of said finger subassemblies in said closed position.

22. The apparatus of claim 21 with said guide means comprising first and second longitudinally extending lower guides each located proximate to and at the bottom of one of said roller members, said first guide having a pressure portion extending to a position approximately in line with the radially outer surface of said one of said roller members with which it is associated.

23. The apparatus of claim 22 with said first pressure portion of said first guide being contoured to engage the fruit at a position near its stem.

24. The apparatus of claim 23 with said second guide having a second support portion for engaging the fruit at a point further from the stem.

25. The apparatus of claim 24 with said actuating means comprising sensing means for sensing the presence of and for providing a signal when fruit is proximate to said finger subassemblies with said actuating means moving said finger subassemblies to said closed position in response to said signal.

26. The apparatus of claim 25 with said sensing means including a sensing bar extending generally for the length of one of said guides and located proximate to the support portion of said one of said guides, means for supporting said sensing bar on that one of said finger subassemblies associated with said one of said guides for pivotal movement towards and away from the other of said finger subassemblies.

27. The apparatus of claim 26 with said sensing means including a switch means having first and second conductive conditions and for providing said signal in said first conductive condition and being operatively connected with said sensing bar for being placed in said first conductive condition when said sensing bar is moved away from said other of said finger subassemblies.

28. The apparatus of claim 27 with said vertical support means comprising a vertically extending scaffold, and tilting means for pivoting said scaffold from an axis near its lower extremity, and rotational means for rotating said scaffold generally about a vertical axis, guide rail means for moving said scaffold along a generally horizontal, arcuate path and transverse means for moving said scaffold generally horizontally, transversely to said arcuate path.

29. The apparatus of claim 1 with said roller means including a pair of roller members, one on each of said finger subassemblies, for gripping the stem of the fruit with said finger subassemblies in said closed position, rotating means for rotating said roller members in a direction for feeding the stem through said finger subassemblies in said closed position, and vertical support means for supporting said finger means for up and down vertical movement, said vertical support means including conveying means for moving said finger means at a rate of linear travel substantially the same as the linear feed rate of a stem through an associated pair of said finger subassemblies in said closed position.

30. The apparatus of claim 1 with said roller means including a pair of roller members, one on each of said finger subassemblies, for gripping the stem of the fruit with said finger subassemblies in said closed position, rotating means for rotating said roller members in a direction for feeding the stem through said finger subassemblies in said closed position, said roller members having an outer surface made of an elastic material with the elastic material of one of said roller members having a higher durometer than the other and with said one of said roller members having an irregular outer surface with the other of said roller members having a smooth outer surface.

References Cited

UNITED STATES PATENTS

| | | | |
|---|---|---|---|
| 410,397 | 9/1889 | Bee | 56—330 |
| 2,962,855 | 12/1960 | Sartorio | 56—334 |
| 3,077,720 | 2/1963 | Grove et al. | 56—328 |
| 3,143,844 | 8/1964 | Polk | 56—328 |
| 3,347,587 | 10/1967 | Frost | 56—328 XR |

RUSSELL R. KINSEY, *Primary Examiner.*